US012117758B2

(12) United States Patent
Takagi

(10) Patent No.: US 12,117,758 B2
(45) Date of Patent: Oct. 15, 2024

(54) IMAGE FORMING APPARATUS CAPABLE OF SUPPRESSING VIBRATION TRANSMISSION TO EXPOSURE UNIT

(71) Applicant: KYOCERA Document Solutions Inc., Osaka (JP)

(72) Inventor: Masaru Takagi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/458,960

(22) Filed: Aug. 30, 2023

(65) Prior Publication Data

US 2024/0069485 A1 Feb. 29, 2024

(30) Foreign Application Priority Data

Aug. 31, 2022 (JP) ................................ 2022-137927

(51) Int. Cl.
*G03G 21/16* (2006.01)
*G03G 15/00* (2006.01)
*G03G 15/01* (2006.01)

(52) U.S. Cl.
CPC ....... *G03G 21/1619* (2013.01); *G03G 15/011* (2013.01); *G03G 15/6567* (2013.01)

(58) Field of Classification Search
CPC ............ G03G 21/1619; G03G 15/011; G03G 15/6567; G03G 21/1695
See application file for complete search history.

(56) References Cited

U.S. PATENT DOCUMENTS

2010/0301546 A1* 12/2010 Ninomiya .......... G03G 15/6567 271/264
2016/0161893 A1* 6/2016 Watanabe .......... G03G 15/6567 399/395
2020/0115178 A1* 4/2020 Murakami ......... G03G 15/6567

FOREIGN PATENT DOCUMENTS

JP 2015113227 A 6/2015

* cited by examiner

*Primary Examiner* — Sandra Brase
(74) *Attorney, Agent, or Firm* — Alleman Hall & Tuttle LLP

(57) ABSTRACT

An image forming apparatus includes a housing frame, an image forming unit, a registration unit, and an exposure unit. The housing frame forms a skeleton of a housing. The image forming unit has a photoconductor drum. The registration unit performs skew correction of a sheet. The exposure unit exposes the photoconductor drum. In the image forming apparatus, the registration unit and the exposure unit are adjacent within the housing frame. The registration unit is attached to the housing frame via a pair of flat plates. The registration unit is supported by a plurality of elastic pieces bent up from the pair of flat plates.

3 Claims, 7 Drawing Sheets

IMAGE FORMING APPARATUS CAPABLE OF SUPPRESSING VIBRATION TRANSMISSION TO EXPOSURE UNIT

INCORPORATION BY REFERENCE

This application is based upon and claims the benefit of priority from the corresponding Japanese Patent Application No. 2022-137927 filed on Aug. 31, 2022, the entire contents of which are incorporated herein by reference.

BACKGROUND

The present disclosure relates to an image forming apparatus.

Image forming apparatuses such as copiers and printers are known to have a registration unit in the middle of a sheet conveying path. In this type of image forming apparatus, the registration unit is installed on an upstream side of an image forming unit. The registration unit is provided with a pair of registration rollers facing each other across the conveying path. The pair of registration rollers make the sheet wait before a transfer position of the image forming unit and perform skew correction of the sheet. The pair of registration rollers feed the sheet toward the transfer position in synchronization with an image forming operation.

SUMMARY

An image forming apparatus according to an aspect of the present disclosure includes a housing frame, an image forming unit, a registration unit, and an exposure unit. The housing frame forms a skeleton of a housing. The image forming unit has a photoconductor drum. The registration unit performs skew correction of a sheet. The exposure unit exposes the photoconductor drum. In the image forming apparatus, the registration unit and the exposure unit are adjacent within the housing frame. The registration unit is attached to the housing frame via a pair of flat plates. The registration unit is supported by a plurality of elastic pieces bent up from the pair of flat plates.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
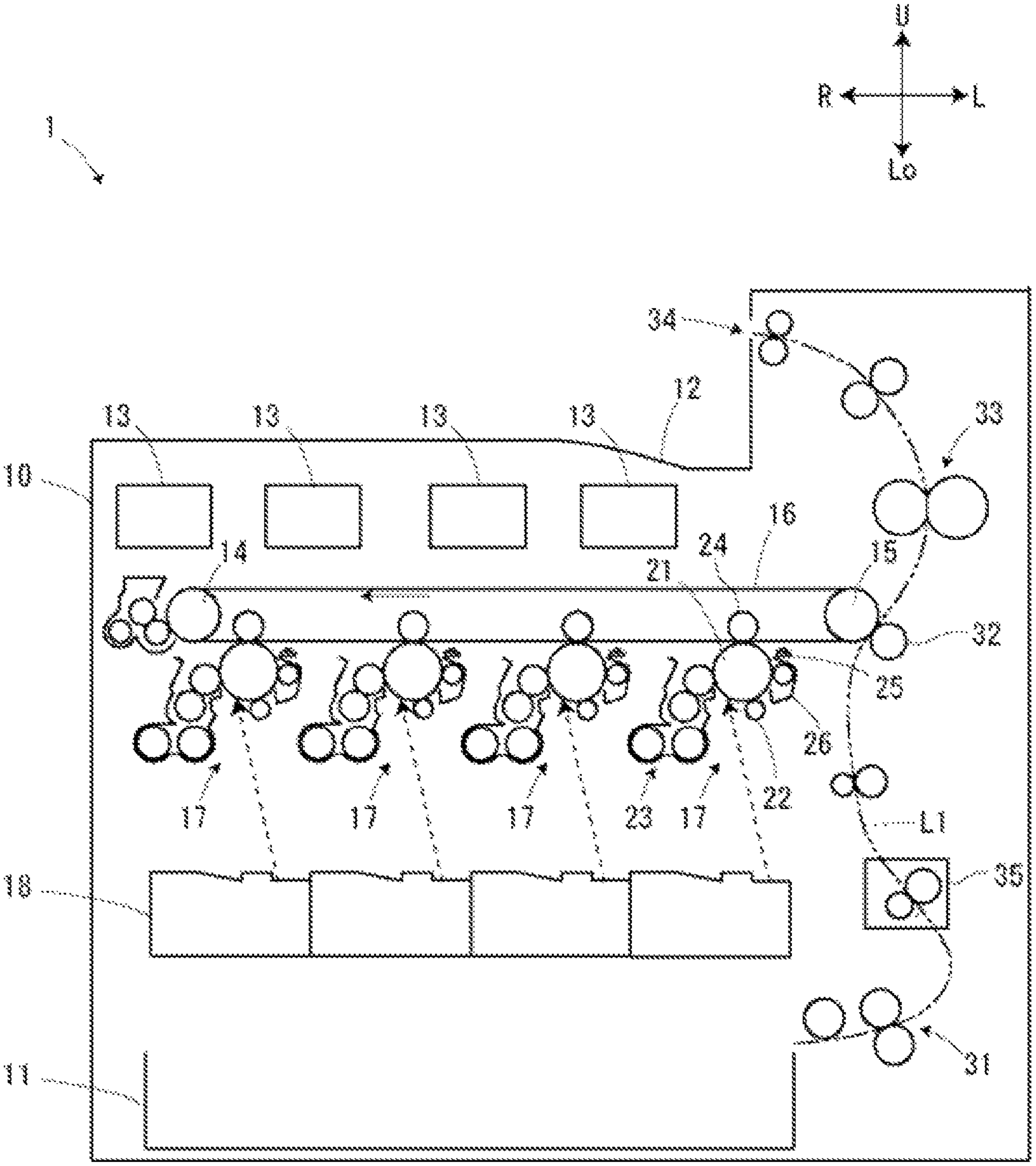
FIG. 1 is a schematic diagram of an image forming apparatus according to an embodiment.
Figure 2:
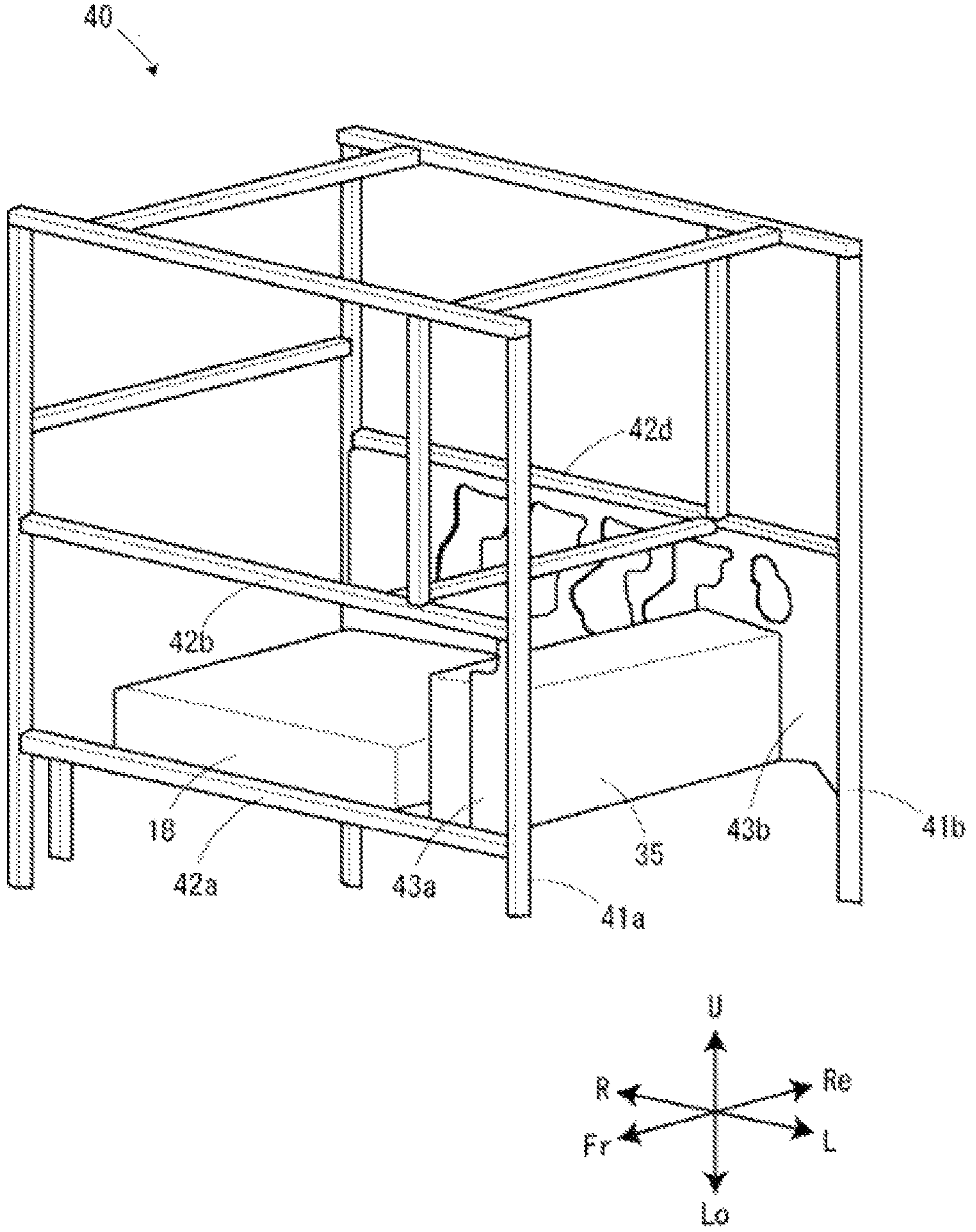
FIG. 2 is a schematic perspective view of a housing frame of the embodiment.

An image forming apparatus of an embodiment will be described below with reference to the drawings. Note that in the following description, a printer will be exemplified as the image forming apparatus. FIG. 1 is a schematic diagram of a printer according to the present embodiment. FIG. 2 is a schematic perspective view of a housing frame of the embodiment. Arrows L, R, U, Lo, Fr, and Re appropriately attached to each figure indicate a left side, a right side, an upper side, a lower side, a front side, and a rear side of the printer, respectively.

As shown in FIG. 1, the printer 1 includes a box-shaped housing 10 in which various devices are accommodated. A sheet feed cassette 11 in which a bundle of sheets is set is accommodated in a lower portion of the housing 10, and a sheet discharge tray 12 on which sheets on which images have been formed are stacked is provided in an upper portion of the housing 10. Below the sheet discharge tray 12, toner containers 13 containing toner are detachably set for each toner color (for example, four colors of magenta, cyan, yellow, and black). An intermediate transfer belt 16 stretched over a pair of rollers 14 and 15 is provided below the plurality of toner containers 13.

A plurality of image forming units 17 are arranged below the intermediate transfer belt 16 in a conveying direction of the intermediate transfer belt 16. Each image forming unit 17 is rotatably provided with a photoconductor drum 21 in contact with the intermediate transfer belt 16, and around the photoconductor drum 21, a charging device 22, a developing device 23, a primary transfer roller 24, a neutralizing unit 25, and a cleaning device 26 are installed in order of the primary transfer process. A waste toner box (not shown) is connected to the cleaning device 26. An exposure unit 18 composed of a laser scanning unit (LSU) is provided below each image forming unit 17.

A sheet conveying path L1 from the sheet feed cassette 11 to the sheet discharge tray 12 is formed by a plurality of rollers at a side portion inside the housing 10. A sheet feed portion 31 is provided on the upstream side (lower side) of the conveying path L1, and a registration unit 35 is provided farther on the downstream side along the conveying path L1 than the sheet feed portion 31. A secondary transfer roller 32 is provided at a side end of the intermediate transfer belt 16 farther on the downstream side along the conveying path L1 than the registration unit 35. A fixing device 33 is provided on the downstream side of the secondary transfer roller 32 along the conveying path L1. In addition, a sheet discharge opening 34 is provided at a downstream end side (upper side) of the conveying path L1.

When the printer 1 forms an image, after a surface of the photoconductor drum 21 is charged by the charging device 22, an electrostatic latent image is formed on the surface of the photoconductor drum 21 by a laser beam from the exposure unit 18. Next, toner is adhered from the developing device 23 to the electrostatic latent image on the surface of the photoconductor drum 21 to form a toner image, and the toner image is primarily transferred from the surface of the photoconductor drum 21 to the surface of the intermediate transfer belt 16. In each image forming unit 17, a toner image of each color is primarily transferred onto the intermediate transfer belt 16, thereby forming a full-color toner image on the surface of the intermediate transfer belt 16. The charge and waste toner remaining on the photoconductor drum 21 are removed by the neutralizing unit 25 and the cleaning device 26.

On the other hand, the sheet feed portion 31 takes a sheet from the sheet feed cassette 11, and the registration unit 35 feeds the sheet toward the secondary transfer roller 32 at timing with the image forming operation. The full-color toner image is secondarily transferred from the surface of the intermediate transfer belt 16 to the surface of the sheet by the secondary transfer roller 32, and the sheet on which the image is transferred is conveyed toward the fixing device 33 downstream of the secondary transfer roller 32. The toner image is fixed on the sheet by the fixing device 33, and the sheet on which the toner image is fixed is discharged from the sheet discharge opening 34 onto the sheet discharge tray 12. As described above, the toner image transferred to the sheet passes through the fixing device 33 to form an image on the surface of the sheet.

As shown in FIG. 2, the housing frame 40 forms a framework of the housing 10 (see FIG. 1) and is formed by joining a plurality of pipe materials. Although a plurality of units are installed inside the housing frame 40, only the installed state of the registration unit 35 and the exposure unit 18 are shown here. The registration unit 35 performs skew correction of the sheet, and vibration occurs in the registration unit 35 during skew correction of the sheet. The registration unit 35 and the exposure unit 18 are adjacent to each other in the housing frame 40, and since the exposure unit 18 exposes the photoconductor drum 21 (see FIG. 1), image quality is degraded when vibration is transmitted from the registration unit 35 to the exposure unit 18.

In this case, a configuration is also conceivable in which the registration unit 35 is attached to the housing frame 40 via a rubber bushing, and vibration of the registration unit 35 is absorbed by the rubber bushing. However, in order to attach the rubber bushing to the housing frame 40, it is necessary to screw and fasten the rubber bushing to the housing frame 40. The vibration of the registration unit 35 is transmitted to the housing frame 40 through the screws, and thus it is not possible for the rubber bushing to sufficiently absorb the vibration of the registration unit 35. Therefore, in the present embodiment, the registration unit 35 is supported in a floating state by a plurality of elastic pieces 44*a* to 44*e* (see FIG. 6 and FIG. 7) that are bent up from flat plates 43*a* and 43*b* to absorb vibrations during skew correction.

Figure 3:
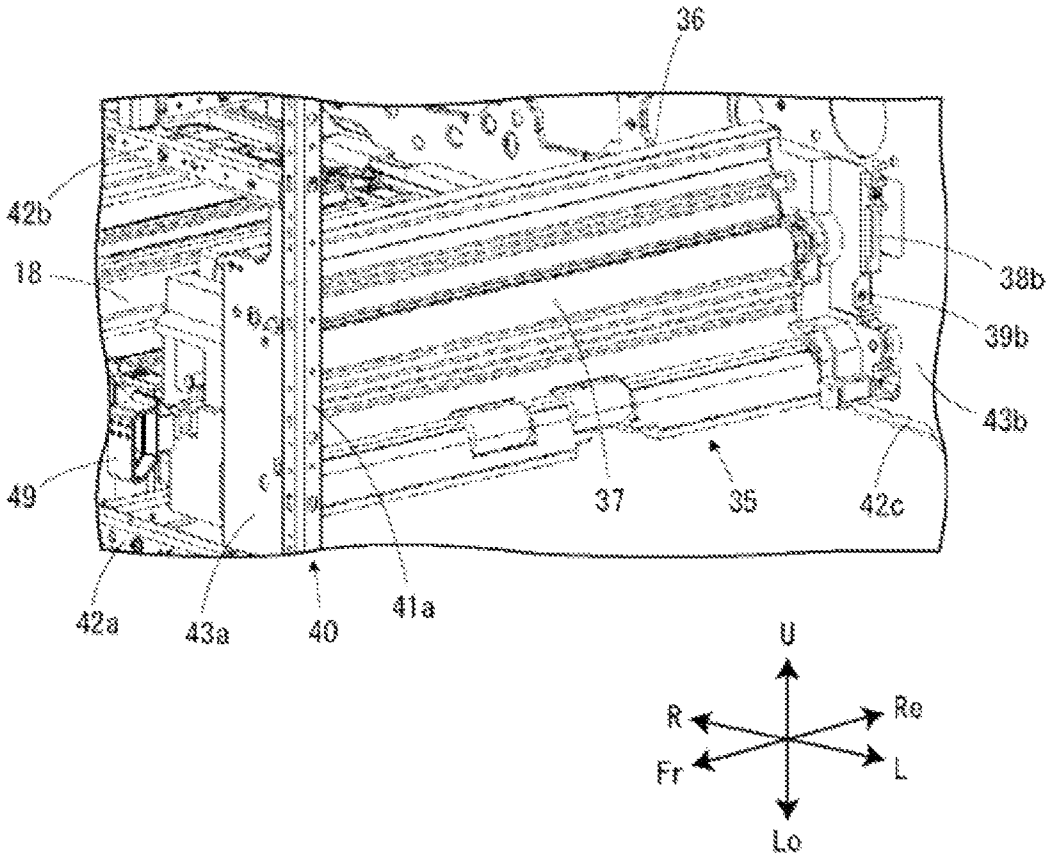
FIG. 3 is a perspective view of a periphery of a registration unit of the embodiment.
Figure 4:
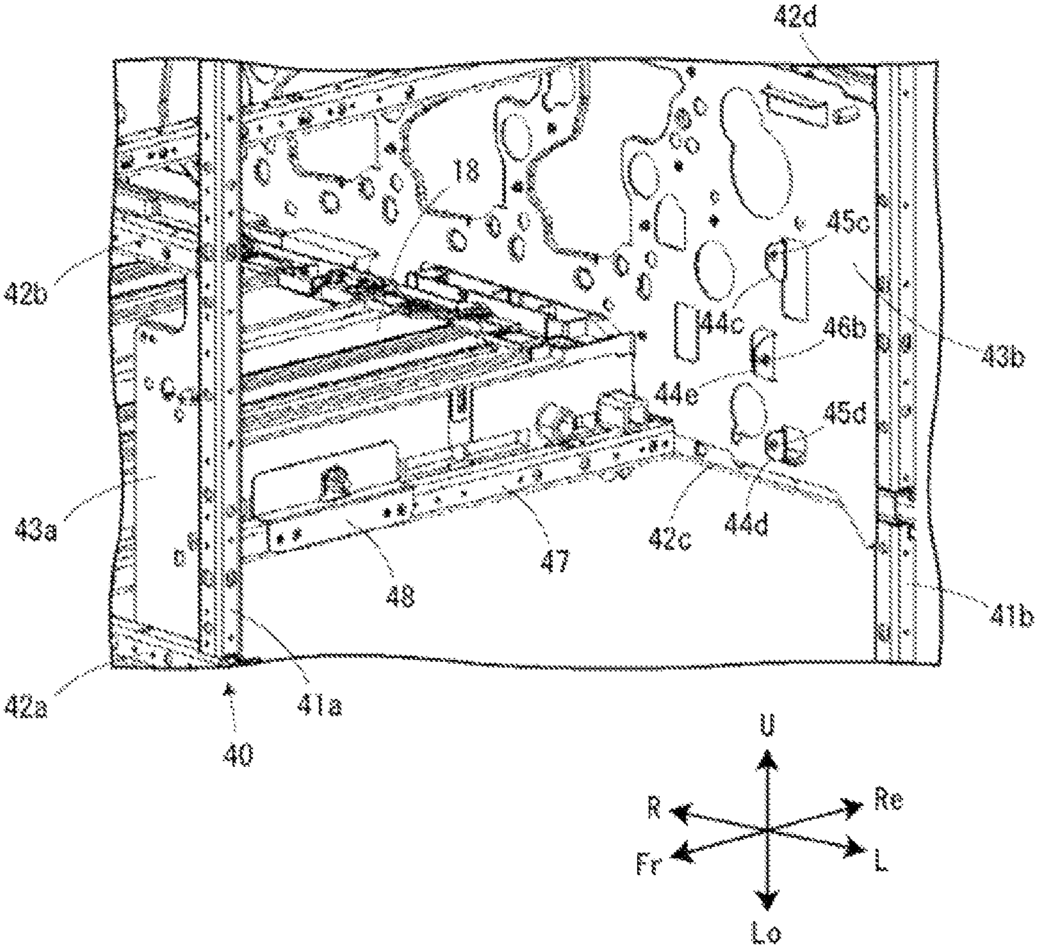
FIG. 4 is a perspective view of an installation location of the registration unit of the embodiment.
Figure 5:
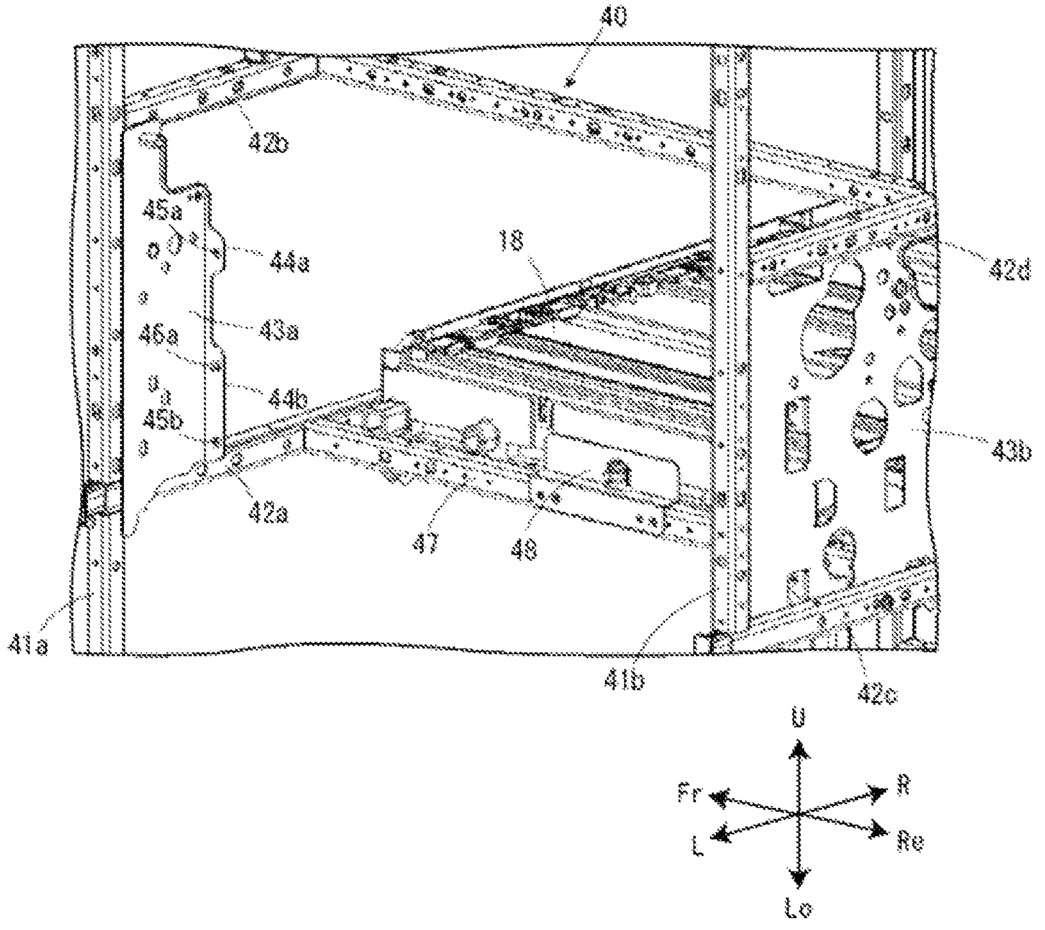
FIG. 5 is a perspective view of an installation location of the registration unit of the embodiment.

The mounting structure of the registration unit will be described with reference to FIG. 3 to FIG. 5. FIG. 3 is a perspective view of a periphery of a registration unit of the embodiment. FIG. 4 and FIG. 5 are perspective views of the installation location of the registration unit of the present embodiment.

As shown in FIG. 3 and FIG. 4, the registration unit 35 is installed on a left side of the housing frame 40. A pair of front and rear vertical pipes 41*a* and 41*b* extend vertically in a vicinity of the registration unit 35, and horizontal pipes 42*a* to 42*d* extend rightward from two vertically spaced locations on the vertical pipes 41*a* and 41*b*. A small flat plate 43*a* is welded to the front side vertical pipe 41*a* and the horizontal pipes 42*a* and 42*b*, and a large flat plate 43*b* is welded to the rear side vertical pipe 41*b* and the horizontal pipes 42*c* and 42*d*. The flat plates 43*a* and 43*b* are made of thin steel plates. The registration unit 35 is attached to the housing frame 40 via the pair of front and rear flat plates 43*a* and 43*b*.

Inside a unit case 36 of the registration unit 35, a pair of registration rollers 37 (only one registration roller is shown, the other registration roller is shown in FIG. 1) that are movable in a sheet width direction (back and forth direction) are rotatably supported. The skew correction of the sheet is performed by abutting a leading edge of the sheet against the registration rollers 37, and misalignment of the sheet is corrected by moving the registration rollers 37 in the sheet width direction. A registration motor 49 is installed in front of the unit case 36, and the pair of registration rollers 37 are connected to the registration motor 49 via a power transmission mechanism (not shown).

A flange 38*a* (see FIG. 6) extends forward from a left-side edge of a front wall of the unit case 36, and a flange 38*b* extends rearward from a left-side edge of a rear wall of the unit case 36. Screw holes (not shown) are formed in two upper and lower locations of the front-side flange 38*a*, and a positioning hole (not shown) is formed in an intermediate portion of the flange 38*a*. Similarly, two upper and lower screw holes are formed in the rear-side flange 38*b*, and a positioning hole 39*b* is formed in an intermediate portion of the flange 38*b*. The registration unit 35 is supported by the elastic pieces 44*a* to 44*e* (see FIGS. 4 and 5) that are bent up in the pair of flat plates 43*a* and 43*b*.

As shown in FIG. 4 and FIG. 5, an upper portion of the right-side edge of the front-side flat plate 43*a* is notched, and a right-side edge at a lower side of the notched portion is bent up toward the inside of the housing to form the pair of elastic pieces 44*a* and 44*b*. Through holes 45*a* and 45*b* are formed in the elastic pieces 44*a* and 44*b*, and the through holes 45*a* and 45*b* correspond to the upper and lower screw holes in the flange 38*a* of the registration unit 35. A crimping pin 46*a* is provided on the lower-side elastic piece 44*b*, and the crimping pin 46*a* corresponds to the positioning hole in the flange 38*a* of the registration unit 35. The registration unit 35 is positioned with respect to the flat plate 43*a* by inserting the crimping pin 46*a* into the positioning hole of the flange 38*a*.

A part of the rear-side flat plate 43*b* is bent upward inside the housing to form three elastic pieces 44*c* to 44*e* so as to face the elastic pieces 44*a* and 44*b* of the front-side flat plate 43*a* in the front-rear direction. Through holes 45*c* and 45*d* are formed in the elastic pieces 44*c* and 44*d*, and the through holes 45*c* and 45*d* correspond to the upper and lower screw holes in the flange 38*b* of the registration unit 35, respectively. A crimping pin 46*b* is provided on the central elastic piece 44*e*, and the crimping pin 46*b* corresponds to the positioning hole 39*b* in the flange 38*b* of the registration unit 35. The registration unit 35 is positioned with respect to the flat plate 43*b* by inserting the crimping pin 46*b* into the positioning hole 39*b* in the flange 38*b*.

The elastic pieces 44*a* to 44*d* are screwed and fastened to the front and rear flanges 38*a* and 38*b* of the registration unit 35, and the registration unit 35 is attached to the housing frame 40 via the pair of flat plates 43*a* and 43*b* facing each other in the sheet width direction (front and rear direction). Even in a case where the registration unit 35 vibrates during skew correction of the sheet, the vibration of the registration unit 35 is absorbed by the elastic pieces 44*a* to 44*d* by receiving the vibration of the registration unit 35 and swinging of the elastic pieces 44*a* to 44*d*. Furthermore, the vibration of the registration unit 35 is also absorbed by the pair of flat plates 43*a* and 43*b*, by the flat pates 43*a* and 43*b* receiving the vibration of the registration unit 35 and slightly bending.

The exposure unit 18 is provided on the right side of the registration unit 35. A pair of bridge pipes 47 (the right bridge pipe is not shown) connecting the horizontal pipes 42*a* and 42*c* are provided on both the left and right sides of the exposure unit 18. A flat plate (another flat plate) 48 is attached to each of the pair of bridge pipes 47, and the exposure unit 18 is fixed to the pair of flat plates 48. The exposure unit 18 is attached to the housing frame 40 via the pair of flat plates 48, and thus the vibration transmitted from the registration unit 35 to the exposure unit 18 via the housing frame 40 is absorbed by bending of the pair of flat plates 48.

Figure 6:
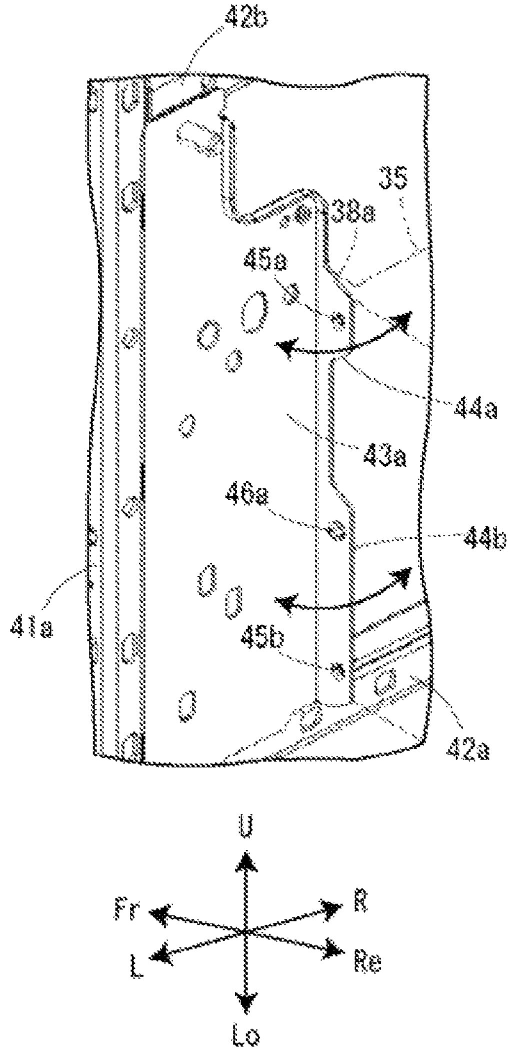
FIG. 6 is a perspective view of a front-side flat plate of the embodiment.
Figure 7:
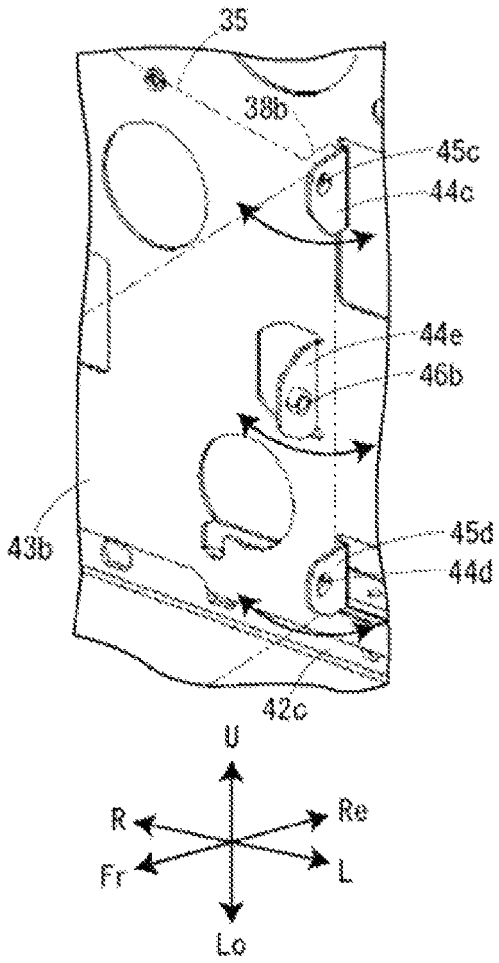
FIG. 7 is a perspective view of a rear-side flat plate of the embodiment.

The vibration absorbing structure of the registration unit will be described with reference to FIG. 6 and FIG. 7. FIG. 6 is a perspective view of a front-side flat plate of the embodiment. FIG. 7 is a perspective view of a rear-side flat plate of the embodiment.

As shown in FIG. 6 and FIG. 7, the elastic pieces 44*a* to 44*e* are bent up in a horizontal direction from the front and rear flat plates 43*a* and 43*b*. The registration unit 35 is float-supported by the elastic pieces 44*a* to 44*e*, and a slight gap is provided between the registration unit 35 and the flat plate 43*b*. During skew correction of the sheet, the pair of registration rollers 37 (see FIG. 3) move in the sheet width direction, and the registration unit 35 vibrates. When the elastic pieces 44*a* to 44*e* receive the vibration of the registration unit 35, the elastic pieces 44*a* to 44*e* swing horizontally as indicated by the arrows with base ends thereof functioning as fulcrums, and vibration directed from the registration unit 35 toward the housing frame 40 is absorbed.

Even in a case where a part of the vibration is transmitted from the registration unit 35 to the housing frame 40, the vibration is absorbed by the flat plate 48 interposed between the housing frame 40 and the exposure unit 18 (see FIG. 4). In this way, the elastic pieces 44*a* to 44*e* and the like are interposed in a vibration transmission path from the registration unit 35 to the exposure unit 18. Vibration is absorbed from the registration unit 35 and before going toward the exposure unit 18, and thus the exposure operation of the exposure unit 18 is not adversely affected by the vibration. Note that the registration unit 35 sways slightly in the horizontal direction; however, the function of the registration unit 35 is not hindered because the registration unit 35 is positioned in the height direction.

As described above, with the present embodiment, the registration unit 35 is attached to the housing frame 40 via the pair of flat plates 43*a* and 43*b* instead of being attached directly to the housing frame 40. The elastic pieces 44*a* to 44*e* are bent up from the pair of flat plates 43*a* and 43*b*, and the registration unit 35 is supported in a floating state by the elastic pieces 44*a* to 44*e*. The elastic pieces 44*a* to 44*e* absorb vibration when the registration unit 35 performs skew correction of the sheet, making it difficult for the vibration to be transmitted from the registration unit 35 to the exposure unit 18 via the housing frame 40, thereby suppressing degradation of the image quality on the sheet.

Note that in the present embodiment, skew correction is performed by the sheet abutting against the registration rollers; however, the method of skew correction by the registration unit is not particularly limited.

In addition, in the present embodiment, the exposure unit is attached to the housing frame via the pair of flat plates, but the exposure unit may be attached directly to the housing frame.

In addition, in the present embodiment, the type of recording media is not particularly limited, and may also be, for example, plain paper, coated paper, tracing paper, or an over head projector (OHP) sheet.

Note that although the present embodiment has been described, other embodiments may be a combination of the above embodiments and modification in whole or in part.

In addition, the technology according to the present disclosure is not limited to the above-described embodiments, and may be variously changed, replaced, and modified without departing from the spirit of the technical idea. Furthermore, if the technical idea can be achieved in another way due to advances in technology or another derived technology, the technical idea may be implemented by using that method. Therefore, the claims cover all implementations that may fall within the scope of the technical idea.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus including a housing frame forming a skeleton of a housing, the image forming apparatus comprising:

an image forming unit having a photoconductor drum;

a registration unit configured to perform skew correction of a sheet; and an exposure unit configured to expose the photoconductor drum; wherein the registration unit and the exposure unit are adjacent within the housing frame;

the registration unit is attached to the housing frame via a pair of flat plates; and the registration unit is supported by a plurality of elastic pieces bent up from the pair of flat plates.

2. The image forming apparatus according to claim 1, wherein the registration unit has a pair of registration rollers movable in a sheet width direction;

the registration unit is attached to the housing frame via the pair of flat plates facing each other in the sheet width direction; and the plurality of elastic pieces are bent up in a horizontal direction from the pair of flat plates.

3. The image forming apparatus according to claim 1, wherein the exposure unit is attached to the housing frame via another pair of flat plates.

* * * * *